United States Patent [19]
Dubinsky et al.

[11] Patent Number: 6,023,443
[45] Date of Patent: Feb. 8, 2000

[54] SEMBLANCE PROCESSING FOR AN ACOUSTIC MEASUREMENT-WHILE-DRILLING SYSTEM FOR IMAGING OF FORMATION BOUNDARIES

[75] Inventors: Vladimir Dubinsky; Alexei Bolshakov; James V. Leggett, III, all of Houston, Tex.

[73] Assignee: Baker Hughes Incorporated, Houston, Tex.

[21] Appl. No.: 09/112,255

[22] Filed: Jul. 8, 1998

Related U.S. Application Data

[63] Continuation-in-part of application No. 08/789,230, Jan. 24, 1997
[60] Provisional application No. 60/045,718, May 6, 1997.

[51] Int. Cl.[7] ........................................... G01V 1/40
[52] U.S. Cl. ........................... 367/76; 367/76; 175/45
[58] Field of Search ................... 367/76, 25, 43, 367/45, 74, 82, 26; 181/102; 175/45

[56] References Cited

U.S. PATENT DOCUMENTS

| | | | |
|---|---|---|---|
| 4,415,998 | 11/1983 | Blizard | 367/25 |
| 4,794,573 | 12/1988 | Bell et al. | |
| 5,010,526 | 4/1991 | Linville, Jr. et al. | |
| 5,060,202 | 10/1991 | Meek et al. | |
| 5,150,331 | 9/1992 | Harris et al. | |
| 5,325,714 | 7/1994 | Lende et al. | 73/253 |
| 5,349,527 | 9/1994 | Pieprzak et al. | |
| 5,521,881 | 5/1996 | Lau et al. | |
| 5,594,706 | 1/1997 | Shoney et al. | 367/76 |
| 5,678,643 | 10/1997 | Robbins et al. | 175/45 |
| 5,721,710 | 2/1998 | Sallas et al. | |
| 5,796,677 | 8/1998 | Kostek et al. | 367/25 |
| 5,841,280 | 11/1998 | Yu et al. | 324/323 |
| 5,852,587 | 12/1998 | Kostek et al. | 367/25 |

FOREIGN PATENT DOCUMENTS

2061315A  5/1981  United Kingdom.

*Primary Examiner*—Christine Oda
*Assistant Examiner*—Anthony Jolly
*Attorney, Agent, or Firm*—Madan, Mossman & Sriram P.C.

[57] ABSTRACT

The present invention provides a system for drilling boreholes having a downhole subassembly which contains an acoustic measurement-while-drilling system. It uses the acoustic velocity through the formations surrounding the borehole and an acoustic transmitter and a set of receivers for determining the bed boundaries surrounding the borehole formation. Semblance of the data is determined in a slowness/intercept-time domain. Coherence and semblance filtering methods are used to differentiate between reflection signals and noise. The position and orientation of the bed boundary relative to the tool are determined. A further processing step uses the relative position and orientation determined for a number of tool positions to further discriminate against noise and obtain an absolute position and depth of the bed boundaries.

18 Claims, 10 Drawing Sheets

SEMBLANCE PROCESSING FOR AN ACOUSTIC MEASUREMENT-WHILE-DRILLING SYSTEM FOR IMAGING OF FORMATION BOUNDARIES

CROSS-REFERENCE TO RELATED APPLICATION

This application is a continuation-in-part of U.S. patent application Ser. No. 08/789,230, filed Jan. 24, 1997, which claims benefit of Provisional application Ser. No. 60/045,718, filed May 6, 1997.

BACKGROUND OF THE INVENTION

1. Field of the Invention

This invention relates generally to systems for drilling boreholes for the production of hydrocarbons and more particularly to a drilling system having an acoustic measurement-while-drilling ("MWD") system as part of a bottomhole assembly for measuring acoustic velocities of subsurface formations during drilling of the wellbores and determining the location of formation bed boundaries around the bottomhole assembly. Specifically, this invention relates to the imaging of bed boundaries using semblance techniques in an MWD system. For the purposes of this invention, the term "bed boundary" is used to denote a geologic bed boundary, interface between layers having an acoustic impedance contrast, or a subsurface reflection point.

2. Description of the Related Art

To obtain hydrocarbons such as oil and gas, boreholes or wellbores are drilled through hydrocarbon-bearing subsurface formations. A large number of the current drilling activity involves drilling "horizontal" boreholes. Advances in the MWD measurements and drill bit steering systems placed in the drill string enable drilling of the horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three dimensional borehole profiles allow hydrocarbon recovery from multiple formations and allow optimal placement of wellbores in geologically intricate formations.

Hydrocarbon recovery can be maximized by drilling the horizontal and complex wellbores along optimal locations within the hydrocarbon-producing formations (payzones). Crucial to the success of these wellbores is (1) to establish reliable stratigraphic position control while landing the wellbore into the target formation and (2) to properly navigate the drill bit through the formation during drilling. In order to achieve such wellbore profiles, it is important to determine the true location of the drill bit relative to the formation bed boundaries and boundaries between the various fluids, such as the oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir. Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface seismic maps, location of the drilling assembly relative to the bed boundaries of the formation around the drilling assembly can greatly enhance the chances of drilling boreholes for maximum recovery. Prior art downhole lack in providing such information during drilling of the boreholes.

Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water around and/or a short distance in front of the drill bit. Resistivity measurements are most commonly utilized to navigate or "geosteer" the drill bit. However, the depth of investigation of the resistivity devices usually extends to 2–3 meters. Resistivity measurements do not provide bed boundary information relative to the downhole subassembly. Furthermore, error margin of the depth-measuring devices, usually deployed on the surface, is frequently greater than the depth of investigation of the resistivity devices. Thus, it is desirable to have a downhole system which can relatively accurately map the bed boundaries around the downhole subassembly so that the drill string may be steered to obtain optimal borehole trajectories.

Thus, the relative position uncertainty of the wellbore being drilled and the critical near-wellbore bed boundary or contact is defined by the accuracy of the MWD directional survey tools and the formation dip uncertainty. MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2°. Such an error translates into a target location uncertainty of about 3.0 meters per 1000 meters along the borehole. Additionally, dip rate variations of several degrees are common. The optimal placement of the borehole is thus very difficult to obtain based on the currently available MWD measurements, particularly in thin payzones, dipping formation and complex wellbore designs.

Recently, PCT application No. PCT/NO/00183 filed by Statoil Corp. disclosed the use of acoustic sensors having a relatively short spacing between the receivers and the transmitter to determine the formation bed boundaries around the downhole subassembly. An essential element in determining the bed boundaries is the determination of the travel time of the reflection acoustic signals from the bed boundaries or other interface anomalies. This application proposes utilizing estimates of the acoustic velocities obtained from prior seismic data or offset wells. Such acoustic velocities are not very precise because they are estimates of actual formation acoustic velocities. Also, since the depth measurements can be off by several meters from the true depth of the downhole subassembly, it is highly desirable to utilize actual acoustic formation velocities determined downhole during the drilling operations to determine the location of bed boundaries relative to the drill bit location in the wellbore.

Additionally, for acoustic or sonic sensor measurements, the most significant noise source is due to acoustic signals traveling from the source to the receivers via the metallic tool housing (commonly referred to as the "body waves") and the mud column surrounding the downhole subassembly (commonly referred to as the "tube waves"). The Statoil application discloses acoustic sensor designs to achieve a certain amount of directivity of signals. It also discloses a transmitter coupling scheme and signal processing method for reducing the effects of the tube wave and the body waves. Such methods, however, alone do not provide sufficient reduction of the tube and body wave effects, especially due to strong direct coupling of the acoustic signals between the transmitters and their associated receivers.

The present invention addresses the above-noted needs and provides a system for drilling boreholes wherein the bottomhole subassembly includes an acoustic MWD system having one acoustic sensor arrangement that is utilized to determine the acoustic velocities of the borehole formations during drilling and another acoustic sensor arrangement for determining bed boundary information based on the formation acoustic velocities measured downhole. Novel acoustic sensor arrangements are disclosed for relatively precisely determining the bed boundary information. A semblance based technique processes the measured reflections from the bed boundaries and determines the position and orientation of the bed boundaries with respect to the borehole tool. Acoustic isolators between the transmitters and their associated receivers are provided to reduce the body wave and tube wave effects. Any number of additional MWD devices or sensors may be included in the bottomhole assembly to obtain additional information about the borehole and the surrounding formations. A steering device or system is included in the bottomhole assembly which can be operated downhole and/or from the surface to steer the drill bit to drill the wellbore along the desired path.

The system of the present invention correlates measurements from the various MWD devices and sensors to provide parameters of interest relating to the drilling operations and formation evaluation. The bed boundary information may be utilized to map the borehole profile, to update or modify seismic data stored in the downhole subassembly and to steer the drill bit so as to obtain the desired borehole profile. The bed boundary and other information computed downhole may be stored downhole for later retrieval and use. Additionally, selected parameters of interest and other information are transmitted to the surface during the drilling operations to aid the driller in controlling the drilling operations including accurately geosteering the drill string.

SUMMARY OF THE INVENTION

The present invention provides a method of accurately imaging bed boundaries using acoustic signals from a transmitter in the downhole assembly that are received at a plurality of receivers, also part of the downhole assembly. The system includes a drill string having a drill bit and a downhole subassembly having a plurality of sensors and measurement-while-drilling devices, a downhole computing system and a two-way telemetry system for computing downhole bed boundary information relative to the downhole subassembly. The downhole subassembly includes an acoustic MWD system which contains a first set of acoustic sensors for determining the formation acoustic velocities during drilling of the wellbore and a second set of acoustic sensors that utilizes the acoustic velocities measured by the system for determining bed boundaries around the downhole subassembly. A computing system is provided within the downhole subassembly which processes downhole sensor information and computes the various parameters of interest including the bed boundaries, during drilling of the wellbore.

In one embodiment, the first and second sets (arrangements) of acoustic sensors contain a transmitter and a receiver array, wherein the transmitter and some of the receivers in the receiver array are common to both sets of acoustic sensors. Each receiver in the receiver array further may contain one or more individual acoustic sensors. In one configuration, the distance between the transmitter and the farthest receiver in one of the acoustic sensor sets is substantially greater than the distance between the transmitter and center of the receivers in the second set. The downhole computing system contains programmed instructions, models, algorithms and other (supplemental) information, including information from prior drilled boreholes, geological information about the subsurface formations and the borehole drill path.

In an alternative embodiment, the acoustic system contains a common transmitter and identical acoustic receiver arrays placed symmetrically on either side of the transmitter axially along the downhole subassembly. In one configuration of such embodiment, a separate stabilizer is placed equidistant between the transmitter and each of the receiver arrays to cause substantially the same amount of reflections of the transmitted acoustic signals. The symmetrical arrangement aids in substantially reducing the effects of the body wave acoustic noise, tube wave acoustic noise associated with the acoustic system and other acoustic waves (compressional waves, shear waves, etc.) propagating along the borehole. Additionally, acoustic isolators may be placed between the transmitter and each of the receiver arrays to dampen the direct acoustic signals between the transmitter and receives and to increase the travel time therebetween so as to reduce the effect of body waves and tube waves on the receivers.

The acoustic system of the present invention determines the actual formation velocities downhole during drilling of the wellbore ad then utilizes such formation velocities to determine the bed boundaries around the downhole subassembly. The drill bit location is computed downhole or is provided to the downhole subassembly from surface measurements. The bed boundary information is utilized to geosteer the drill string so as to maintain the borehole at a desired place within the formation. The acoustic velocity and bed boundary information is utilized to correct or update seismic maps and to correlate measurements from other MWD measurements.

The present invention also provides a method for drilling a borehole utilizing a downhole subassembly having a first and second acoustic sensor arrangement and a computing system for computing measurements downhole during the drilling of the borehole. The method comprises: (a) conveying the downhole subassembly along the wellbore; (b) determining downhole, by the computing system, the velocity of acoustic signals through formations near the downhole subassembly from measurements made from the first acoustic sensor arrangement; and (c) determining downhole, by the computing system, bed boundaries of the formations from measurements from the second acoustic sensor arrangement and the determined acoustic velocities in accordance with programmed instructions provided to the computing system. The drilling direction is adjusted based on the location of the downhole assembly in relation to the formation bed boundaries.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

In general, the present invention provides a drilling system for drilling of boreholes. The drilling system contains a drill string having a downhole subassembly that includes a drill bit at its bottom end and a plurality of sensors and MWD devices, including an acoustic MWD system having a first set of acoustic sensors for determining the formation acoustic velocity while drilling the borehole and a second set of acoustic sensors for determining the bed boundaries by utilizing the acoustic velocity measurements made by the first set of acoustic sensors. A downhole computer and associated memory are provided for computing various downhole operating parameters, to map the formation around the downhole subassembly, to update stored models and data as a result of the computed parameters and to aid the driller in navigating the drill string along a desired wellbore profile.

The system of the invention also preferably includes devices for determining the formation resistivity, gamma ray intensity of the formation, the drill string inclination and the drill string azimuth, nuclear porosity of the formation and the formation density. The drill string may contain other MWD devices known in the art for providing information about the subsurface geology, borehole conditions and mud motor operating parameters, such as the differential pressure across the mud motor, torque and the condition of the bearing assembly. Selected data is transmitted between the downhole subassembly and surface computing apparatus via a two-way telemetry system. The surface computing apparatus transmits signals to the downhole subassembly for controlling certain desired operations and also for processing the received data according to programmed instruction to improve the drilling operations.

Figure 1:
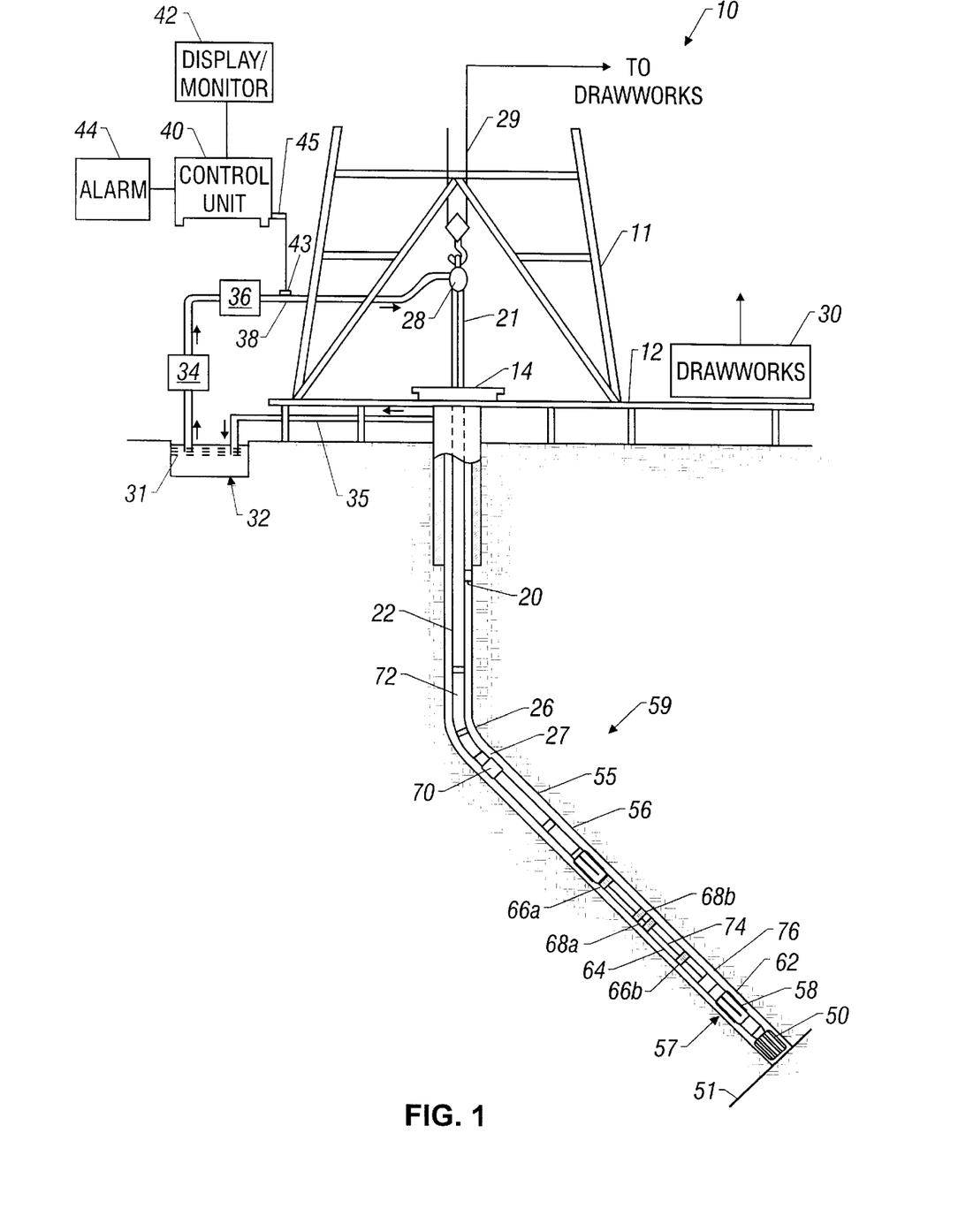
FIG. 1 shows a schematic diagram of a drilling system having a drill string that includes an acoustic sensor system according to the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In the preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. One resistivity measuring device is described in U.S. Pat. No. 5,001,675, which is assigned to the assignee hereof and is incorporated herein by reference. This patent describes a dual propagation resistivity device ("DPR") having one or more pairs of transmitting antennae 66a and 66b spaced from one or more pairs of receiving antennae 68a and 68b. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is preferably placed in a housing 70 above the mud motor 55 and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

U.S. Pat. No. 5,325,714 to Lende, assigned to the assignee hereof, which is incorporated herein by reference, discloses placement of a resistivity device between the drill bit and the mud motor. The above described resistivity device, gamma ray device and the inclinometer are preferably placed in a common housing that may be coupled to the motor in the manner described in U.S. Pat. No. 5,325,714. Additionally, U.S. patent application Ser. No. 08/212,230, assigned to the assignee hereof, which is incorporated herein by reference, discloses a modular system wherein the drill string contains modular assemblies including a modular sensor assembly, motor assembly and kick-off subs. The modular sensor assembly is disposed between the drill bit and the mud motor as described herein above. The present invention preferably utilizes the modular system as disclosed in U.S. Ser. No. 08/212,230.

The downhole assembly of the present invention preferably includes a MWD section 78 which contains a nuclear formation porosity measuring device, a nuclear density device and an acoustic sensor system placed above the mud motor 64 in the housing 78 for providing information useful for evaluating and testing subsurface formations along borehole 26. The preferred configurations of the acoustic sensor system are described later with reference to FIGS. 3a, 3b and 5a. The present invention may utilize any of the known formation density devices. U.S. Pat. No. 5,134,285, which is assigned to the assignee hereof and which is incorporated herein by reference, discloses a formation density device that employs a gamma ray source and a detector which may be utilized in the system of the present invention. In use, gamma rays emitted from the source enter the formation where they interact with the formation and attenuate. The attenuation of the gamma rays is measured by a suitable detector from which density of the formation is determined.

The porosity measurement device preferably is the device generally disclosed in U.S. Pat. No. 5,144,126, which is assigned to the assignee hereof and which is incorporated herein by reference. This device employs a neutron emission source and a detector for measuring the resulting gamma rays. In use, high energy neutrons are emitted into the surrounding formation. A suitable detector measures the neutron energy delay due to interaction with hydrogen and atoms present in the formation. Other examples of nuclear logging devices are disclosed in U.S. Pat. Nos. 5,126,564 and 5,083,124.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention.

Figure 2:
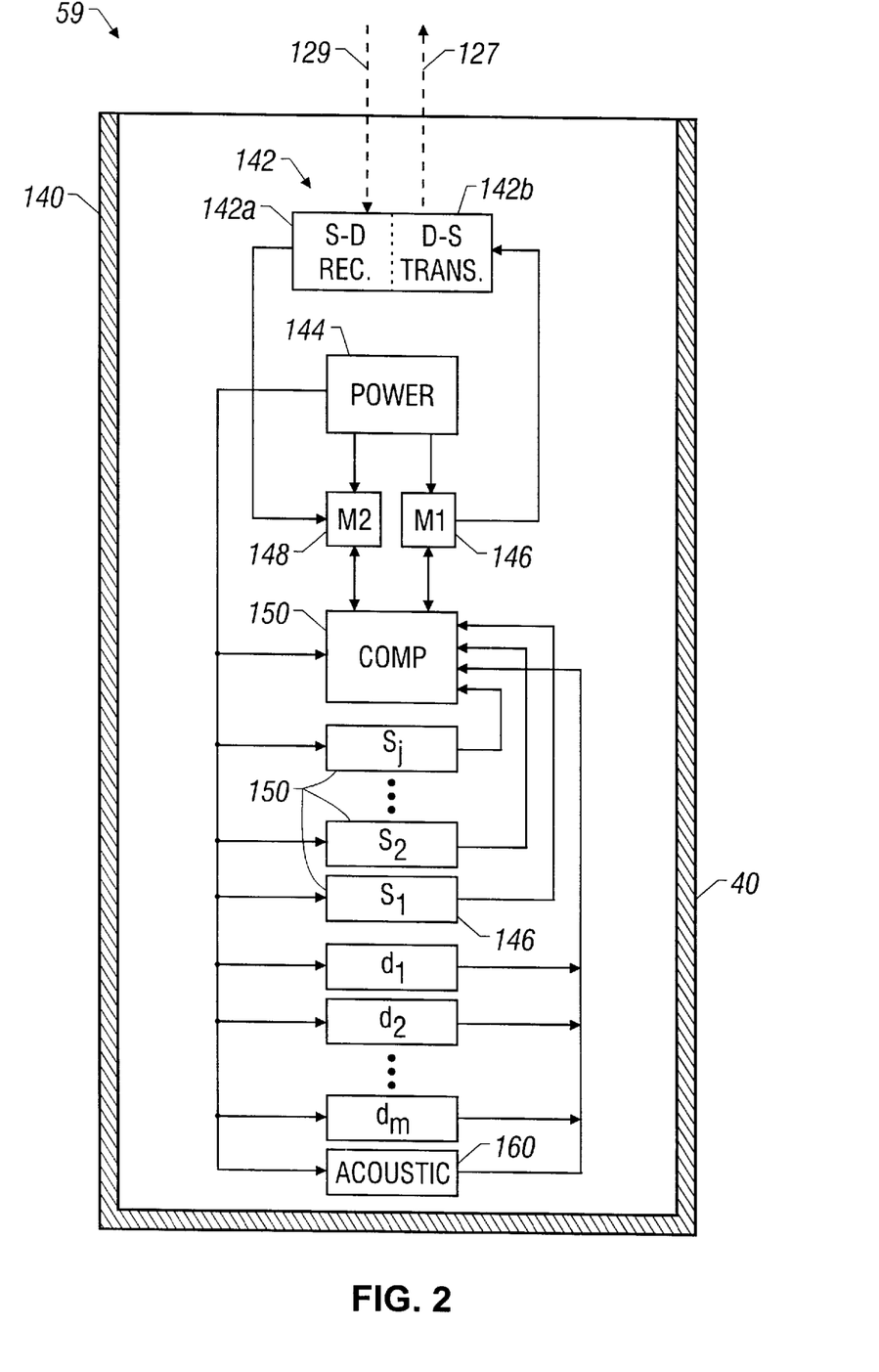
FIG. 2 shows a functional block diagram of the major downhole elements of the system shown in FIG. 1.

FIG. 2 shows a functional block diagram of the major elements of the downhole subassembly 59 and further illustrates the data communication paths between the various system elements. It should be noted that FIG. 2 illustrates only one arrangement of the elements and a system of data communication therebetween. Other arrangements may be utilized equally effectively for the purpose of this invention. For convenience, the sensors for determining the downhole operating conditions and the downhole assembly health are denoted by $S_1$–$S_j$, the acoustic sensor system is denoted by numeral 160 while the remaining downhole MWD devices, such as the nuclear, electromagnetic, directional and the like, are denoted by $d_1$–$d_m$. The sensors $S_1$–$S_j$, MWD devices $d_1$–$d_m$ and the desired acoustic sensor system 160 are arranged within the downhole subassembly in a desired manner. During operation, a predetermined number of discrete data points output from the sensors and MWD devices are stored within a buffer which, in FIG. 2, is included as a partitioned portion of the memory capacity of the computer 150. Alternatively, the buffer storage can comprise a separate element (not shown).

Sensor response relationships or "models" for the acoustic sensor system and other sensors in the downhole subassembly are preferably stored in a memory 148. These models are determined mathematically and/or by measuring responses of the sensors in a known test formations. In addition, other reference data such as data defining the targeted formations to be drilled, seismic data, offset well data is preferably stored downhole in the memory 148. A two-way data and command signal communications are provided between the computer 150 and the memory 148. The responses from the sensors $S_1-S_j$, $d_1-d_m$ and 160 are transmitted to the computer 150 wherein they are transformed into parameters of interest or answers as described later. The downhole electronics for processing signals downhole and to perform other computations includes the computer or controller 150, memory 145 and 146, and other desired components, such as signals processors, amplifiers, etc. (not shown). For simplicity, the use of such components is known and are thus, not included in FIG. 2.

Still referring to FIG. 2, the parameters of interest are transmitted to the surface via the up-link telemetry path 127 or stored in the memory 146 for subsequent retrieval at the surface. Since the acoustic sensor system 160 and other sensors 152 and $d_1-d_m$ are placed axially along the downhole subassembly, their responses do not correspond to the same measure point within the borehole 26 (see FIG. 1). Prior to combining or correlating the data from different sensors, the computer 150 shifts the data to a common depth point. Also, the various devices $d_1-d_m$ do not necessarily exhibit the same vertical resolution. Therefore, vertical resolution matching is performed by the computer 150 before combining or correlating measurements from different sensors.

Once computed from the depth-shifted and resolution-matched data, the parameters of interest are then passed to the downhole portion of the telemetry system 142 and subsequently telemetered to the surface by a suitable up-link telemetry means illustrated conceptually by the broken line 127. The power source 144 supplies power to the telemetry element 142, computer 150, memories 146 and 148 and associated control circuits (not shown). Information from the surface is transmitted over the downlink telemetry path illustrated conceptually by the broken arrow 129 to the downhole receiving element of the downhole telemetry unit 142, and then transmitted to the data storage unit 148 for subsequent use.

Figure 3A:
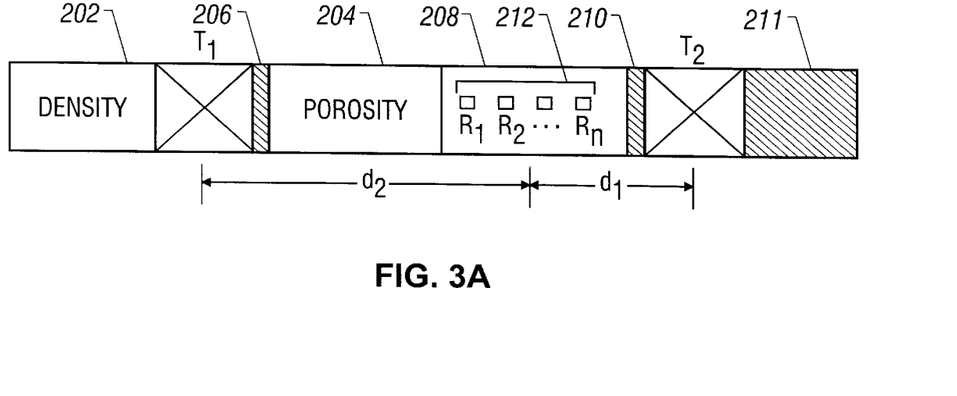
FIG. 3a shows an embodiment of the acoustic sensor system for use in the system of the present invention.

FIG. 3a is a schematic diagram of a portion 200 of the downhole subassembly showing an embodiment of the acoustic system of the present invention placed in the MWD section 78 shown in FIG. 1. The subsystem of FIG. 3a is preferably placed between the mud motor 55 and the downhole telemetry section 72. The subsystem 200 contains a nuclear density device 202 and a nuclear porosity device 204 of the type described earlier, separated by an acoustic isolator section 206. The density device 202 and the porosity device 204 may be enclosed in a common housing 208 or formed as individual sections or modules. A first acoustic transmitter or a set of transmitters $T_1$ is placed between the density device 202 and the first isolator 206. A second acoustic transmitter or set of transmitters $T_2$ is placed past the porosity device and a second acoustic isolator 210. A plurality of acoustic receivers R1–Rn are placed axially spaced from each other between the transmitters $T_1$ and $T_2$. The distance $d_2$ between the transmitter $T_1$ and the center of the far receiver of the array 212 is preferably less than four and one half (4.5) meters while the distance $d_1$ between transmitter $T_2$ and the near receiver of the array 212 is no less than ten (10) centimeters.

Each of the transmitters and the receivers are coupled to electronic circuitry (not shown) which causes the acoustic transmitters to generate acoustic pulses at predetermined time intervals and the receivers to receive any reflected acoustic signals from the borehole formations. In one mode of operation, the acoustic system for determining the formation acoustic velocities is selectively activated when drilling and the acoustic system for determining the bed boundary information is activated when the drilling activity is stopped so as to substantially reduce acoustic noise generated by the drill bit. In an alternative mode of operation, both the velocity and bed boundary measurements may be while the drilling is in progress. Other suitable modes of operation may also be utilized in the system of the present invention.

In the present system, an array of two or more receivers is preferred over a smaller number of receivers to obtain more accurate acoustic measurements. It is known that the quality of acoustic measurements may be enhanced by utilizing receiver arrays having a large number of receivers. In operation, the transmitters are preferably energized several times over a known time period and the received signals are stacked to improve resolution. Such data processing techniques are known in the art and are thus not described in detail herein. The transmitter $T_1$ is preferably operated at a preselected frequency between 5 to 20 KHz while the transmitter $T_2$ is operated at a frequency between 100 Hz to 5 KHz. The downhole computer 150 determines the time of travel of the acoustic signals and thus the velocity of the acoustic signals through the formation by processing signals from the first transmitter T1 and the receivers 212 by utilizing any of the methods known in the art. The computer then determines the distance between a measure point in the subassembly 200 and the bed boundaries around the downhole subassembly from data received by the receivers in response to the signals transmitted by the transmitter $T_2$ and by utilizing the actual acoustic velocity measurements determined by the computer.

As noted previously, the distance $d_2$ is preferably less than 4.5 meters, which has been determined in the art to be sufficient for determining the acoustic velocities through the formations surrounding the transmitter and receiver array. However, large distance between the transmitter and receiver is detrimental in that the tube waves and body waves may constitute dominant signals received by the receivers, which are then filtered or removed by mathematical techniques known in the art, prior to processing the signals reflected from the bed boundaries. In order to reduce the effects of the body waves, acoustic isolators 206 and 208 are respectively placed between the transmitters $T_1$ and $T_2$ and the receivers. A portion of the isolator preferably extends beyond the housing 211, i.e., into the annulus between the borehole and the downhole subassembly so as to dampen or reduce the direct coupling effect of the tube waves. The transmitters may be operated by sweeping the frequencies within their respective ranges or may be operated at different discrete multiple frequencies to remove the noise and to thereby improve the signal quality. The downhole computer 150 may be programmed to operate the acoustic sensor systems at the desired frequencies and the desired time intervals. The frequency used typically depends upon the depth of investigation and resolution desired for a particular application.

Figure 3B:
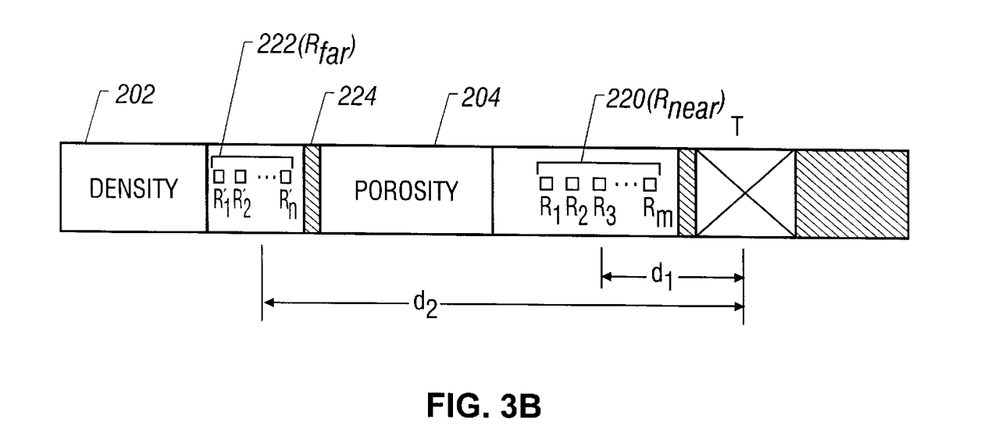
FIG. 3b shows an alternative embodiment of the acoustic sensor system for use in the system of the present invention.

The acoustic system embodiment of FIG. 3a shows two transmitter and a single receiver array. Some or all of the receivers in the array may be utilized as the short-spaced receivers and similarly some or all receivers in the array may be utilized as the long-spaced receivers. The acoustic elements in the present invention may be configured to contain a single transmitter and a short-spaced receiver or receiver array and a long-spaced receiver or receiver array as shown in FIG. 3b. In such a configuration, the single transmitter T is preferably placed at one end of the subassembly and a near receiver array ($R_{near}$) 220 having receivers $R_1$–$R_m$ is placed at a distance $d_1$ and a far receiver array ($R_{far}$) 222 having receivers $R'_1$–$R'_n$ is placed at a distance $d_2$ from the transmitter T. The acoustic isolator 222 in this configuration is placed between the transmitter T and the long-spaced receiver array 222. The single transmitter T may be operated during one time interval at a first frequency or set of frequencies for the short-spaced receivers 220 and operated in a second time interval at a second frequency or set of frequencies for the long-spaced receivers 222. In the configurations shown in FIG. 3a–b, all of the acoustic sensors are placed above the mud motor 55. Alternatively, some of the receivers may be placed above the mud motor and the others below the mud motor.

Figure 4:
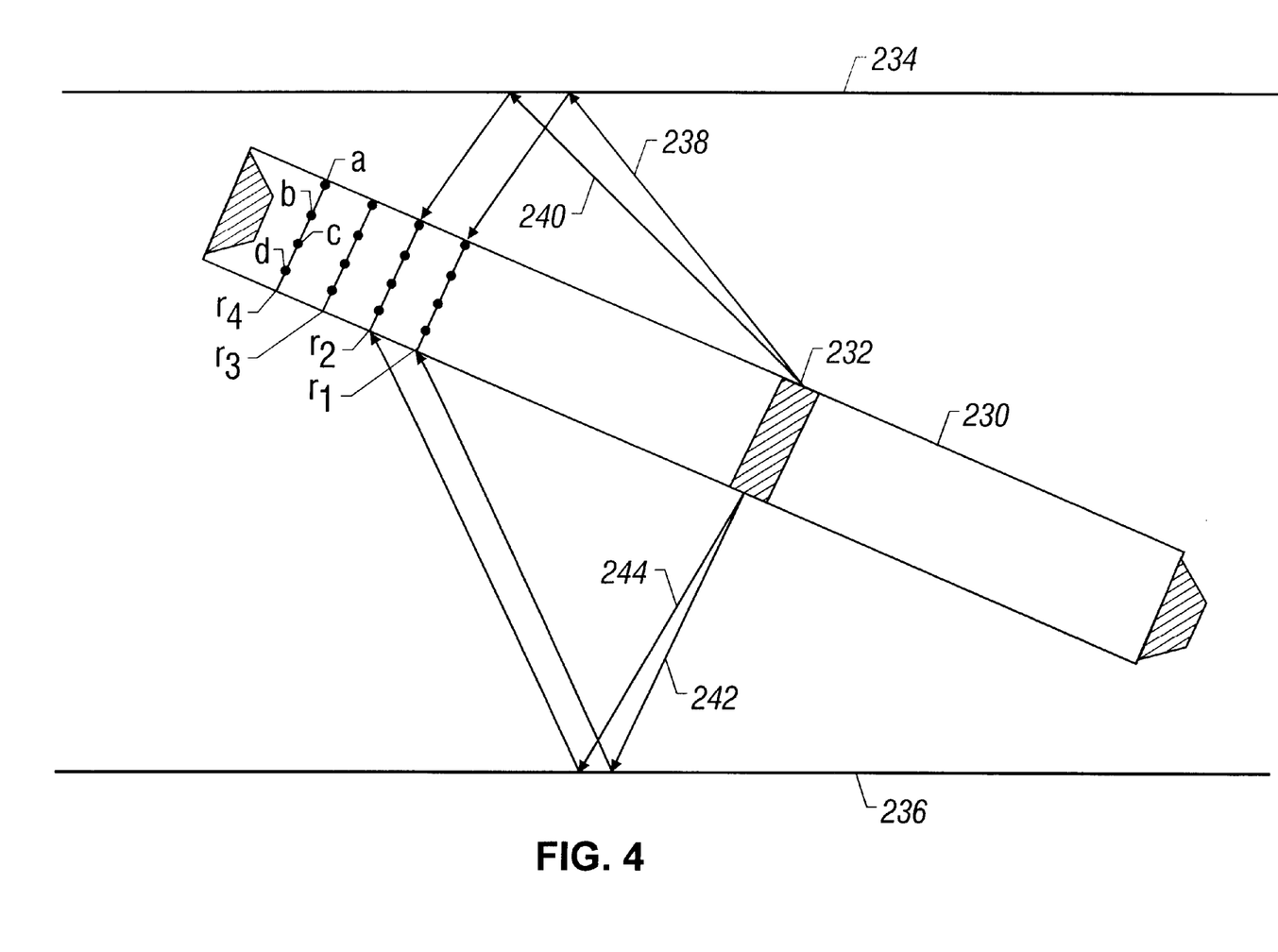
FIG. 4 shows an acoustic sensor system for use in the system of FIG. 1.

The processing of the data for imaging bed boundaries is shown by means of an example. FIG. 4 is a schematic illustration of an embodiment 230 between two boundaries 234 and 236. The device has a single transmitter 232 and four receivers r1, r2, r3 and r4. Also shown are raypaths 238, 240 for waves from the transmitter that are reflected at the boundary 234 and received by receivers r1, r2. In addition, raypaths 242, 244 for waves from the transmitter that are reflected at the boundary 236 and received by receivers r1, r2 are also indicated.

Figure 5:
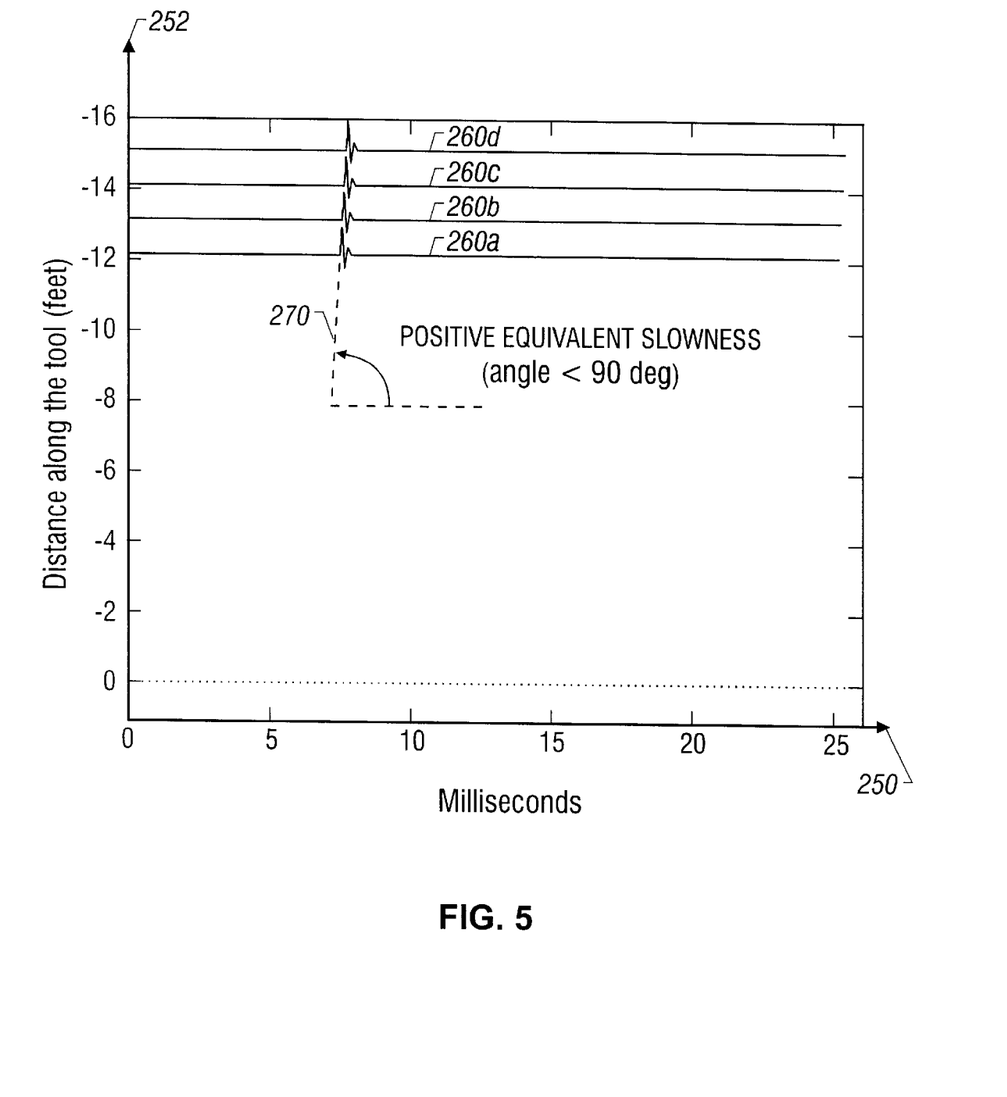
FIG. 5 shows a schematic diagram of reflection signals from a boundary detected in the sensor system of FIG. 4
Figure 6:
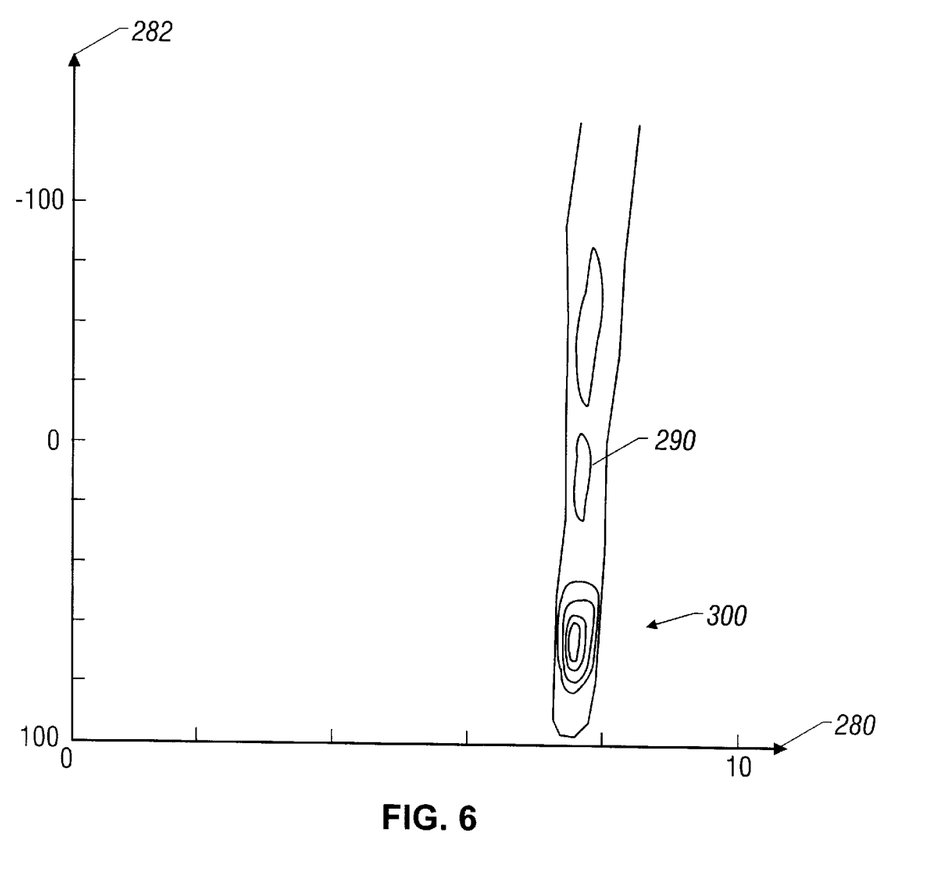
FIG. 6 shows a coherency display of the data of FIG. 5.

FIG. 5 shows signals that would be received at the receivers r1–r4 corresponding to reflections from the boundary 236 below the device. The abscissa is the travel time and the ordinate is the distance between the source and the receiver. The traces 260a–260d are received signals corresponding to reflected waves from the boundary 236. The waves could be compressional waves or shear waves, each type of wave having a different velocity of propagation and hence a different arrival time at the reflector. FIG. 6 shows the result of transforming the signals shown in FIG. 5 to a slowness—minimum offset time domain. Plotted are contours 290 showing the semblance of the traces 260a–260d in the transformed domain. The contour plot is for purposes of simplifying the illustration here: other types of displays, such as color coding or gray-scale displays of the semblance are used to make the subsequent interpretive steps easier.

The semblance of a set of signals $f_i$ (j) is given by $$Sem(T, S, w) = \frac{\sum_{i=1}^{n} \left( \sum_{j=t_i}^{j=t_j+w} f_i(j) \right)^2}{\sum_{i=1}^{n} \sum_{j=t_i} f_i^2(j)} \quad (1)$$

where w=W/SR, W being the length of the time window and SR is the time sampling rate, S is the slowness, $t_i=\{T+S * (D_i-D_1)\}/SR$, $D_i$ is the distance from the source to the i-th receiver, and n is the number of receivers.

The semblance is basically a measure of the similarity of the traces, such as that shown in FIG. 5, along lines of constant slope. One such line is shown as 270 in FIG. 5 and corresponds to the peak of the contour values indicated by 300 in FIG. 6.

Figure 7:
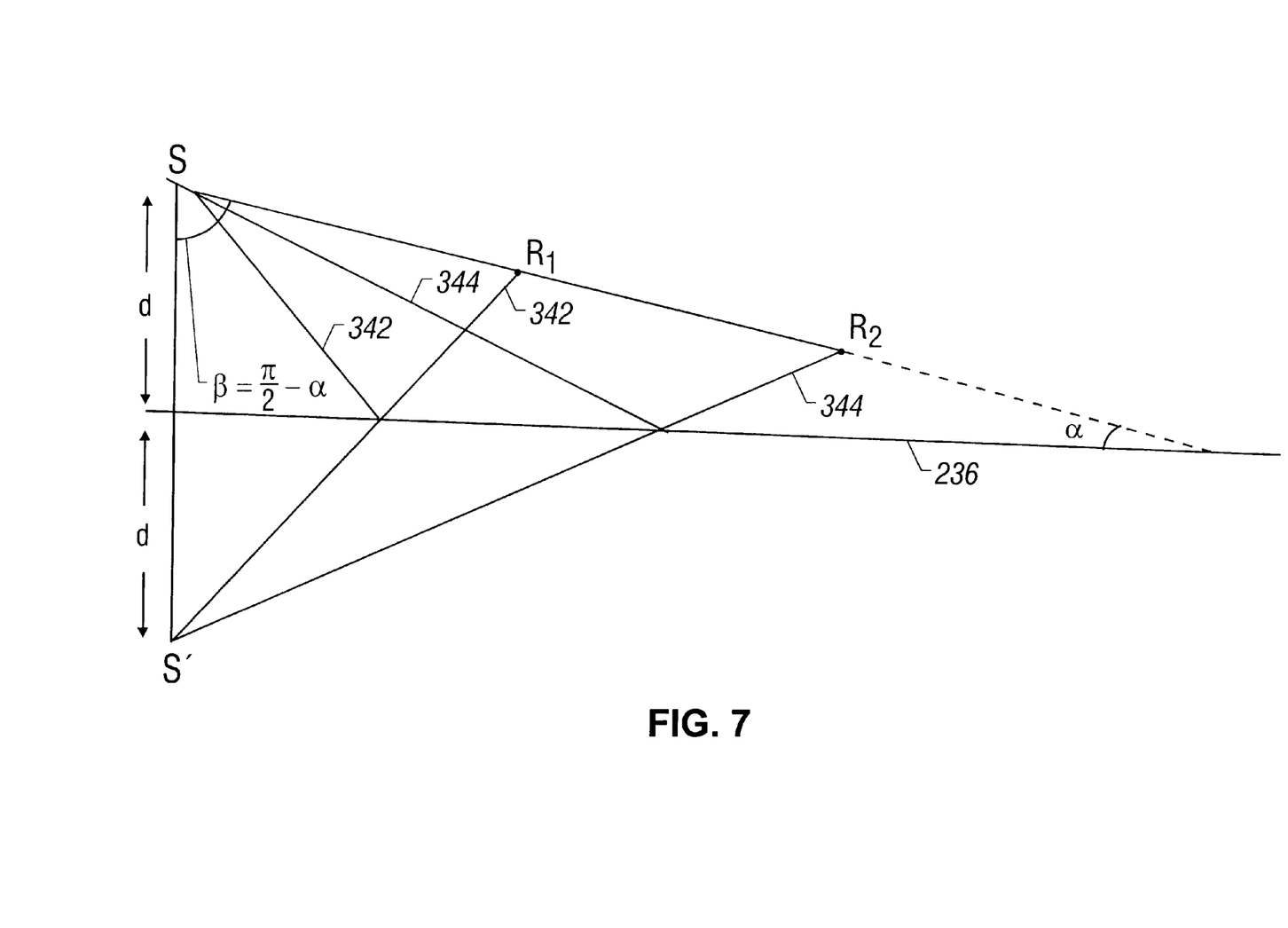
FIG. 7 is a schematic diagram illustrating raypaths from the source to the receiver reflected from a bed boundary in the sensor system of FIG. 4

The relation between the travel times at the different receivers can be seen with reference to FIG. 7. A source S is shown at a distance d from a bed boundary 236. Raypaths 342, 344 from the source to two receivers R1, R2 for a reflection from the bed boundary 236 are indicated. The tool axis S-R1-R2 is inclined at an angle a to the bed boundary, giving an angle P between the tool and the normal to the bed boundary as $\pi/2$-α. Denoting by S' the image point of the source in the reflector, the travel time from the source to the i - th receiver is given by $$T_i = \sqrt{(2d)^2 + D_i^2 - 2(2d)D_i \cos(\pi/2 - \alpha)} \Big/ v \quad (2)$$

The present invention uses values of the velocity v obtained from the direct signal between a source and a plurality of receivers in the tool. A peak in the semblance such as 300 in FIG. 6 has a near-receiver time and a slowness associated with it. The slowness is the difference in time of arrival between two receivers divided by the distance between the receivers. Hence knowing the distance from the transmitter to the near receiver and the slowness, equation (2) makes it possible to determine the distance d from the transmitter to the reflecting boundary as well as the orientation of the transmitter-receiver assembly to the reflecting boundary. Those versed in the art would recognize that, instead of the near-receiver distance, any reference receiver could be used, with a corresponding reference receiver time and slowness.

Those versed in the art would recognize that the relation between the travel time and the source-receiver distance can be exactly described by a hyperbola. Conventional seismic prospecting relies on this relation to perform the process of "migration" of seismic reflections. In seismic prospecting, the source-receiver distances are typically small in comparison with the depths to the reflectors and the angle of incidence is typically small (less than 45°). In seismic prospecting, a zero-offset intercept time is used where the slowness scans are performed (rather than the minimum source-receiver offset as in the present invention). A hyperbola in the time-distance domain maps into an ellipse in the slowness-time intercept domain. The method of the present invention relies on the fact that where the source-receiver distances are large in comparison with the distance to the boundary, the time-distance relation within the spatial sampling window can be approximated by a straight line. A straight line in the time-distance domain maps into a point in the slowness/intercept-time domain, so that the semblance of a reflection arrival would be a single well defined peak in the slowness/intercept-time domain. Due to deviation from linearity in the time-distance domain and to measurement noise, the measured coherence will be smeared.

With slight modification (to account for deviation from linearity), the method of the present invention could also be used where source-receiver distances are small in comparison with distances to bed boundaries, and also where receivers are disposed on both sides of the source. Such modifications are intended to be within the scope of the present invention.

With this as background, the processing steps of the present invention would be better understood.

FIG. 7 schematically illustrates the important steps of the present invention. Processing starts at an initial position of the downhole tool 310. The signals from all the receivers at this location are gathered 312 to give data such as traces 260a–260d in FIG. 5. The semblance of the data in the slowness-time domain is determined 314 to give data such as shown by the display in FIG. 6. As noted above, color displays or gray-scale displays are better suited for the purpose.

Figure 8:
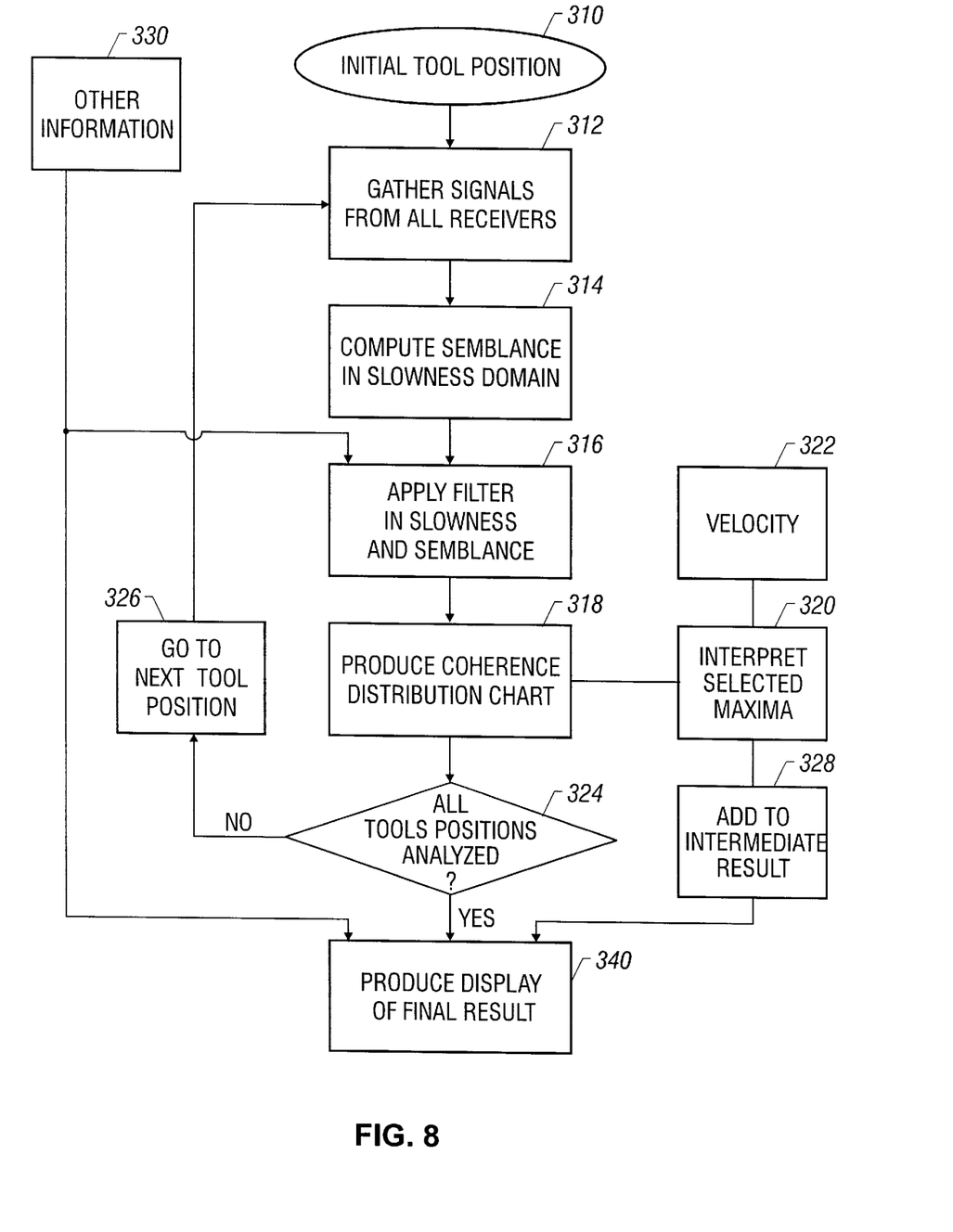
FIG. 8 is a functional block diagram of a the steps of the present invention for determining the position of a bed boundary.

Next, the semblance data are filtered 316. Supplemental information, such as seismic data, logs at nearby wells, well survey data, etc., can give an indication of approximately where the bed boundary is with respect to the downhole device. By the use of equations (2), this gives an estimate of where in the slowness-time domain bed boundary reflections are likely to be present, defining a zone of interest. Data within the zone of interest are used for the next step 318.

Figure 9:
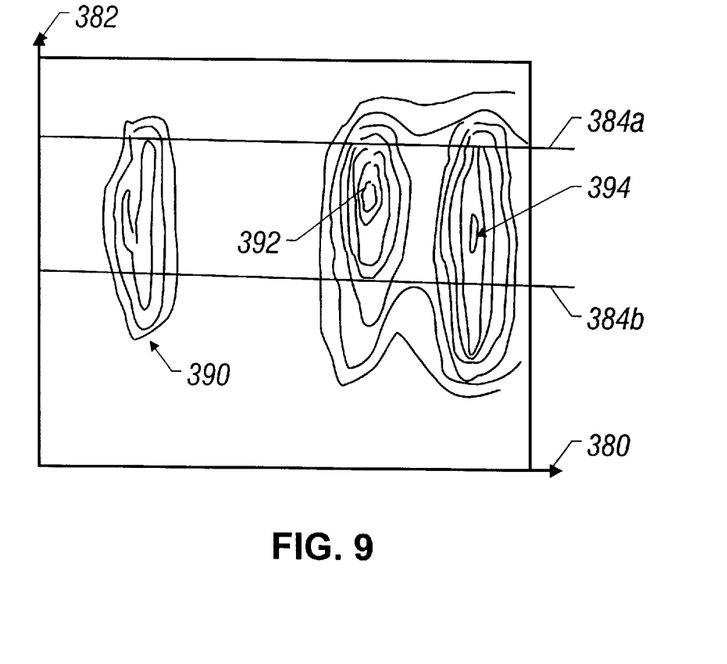
FIG. 9 is a schematic diagram showing semblance data at an intermediate step of FIG. 8.

There are two aspects to the filtering of the data. One aspect is that of semblance or coherence filtering, which makes use of the coherence of the data. In one embodiment of the invention, a coherence distribution of the data is obtained, the local maxima of the coherence or semblance values are determined, and a selection of an acceptable range of coherence values is made. The other aspect of the filtering is a slowness filtering that uses the semblance of the data. As discussed above, in one embodiment of the invention, this includes the selection of a range of expected values of the slowness based upon supplemental information. The filtering step is schematically illustrated in FIG. 9 which is a representation of semblance plot of data. The abscissa 380 is the arrival time and the ordinate 384 is the slowness. The zone between 384a and 384b defines the range of slownesses that would be expected from a priori considerations. The semblance data shown three maxima, indicated by 390, 392, and 394. In this instance, the peak at 390 corresponds to the actual reflection of body waves emanating from the transmitter, reflected by the bed boundary and received at the receiver. The higher semblance contours 392, 394 correspond to tube waves that are propagated along the borehole and are generally stronger than reflection signals. Only data between lines 384a and 384b that have a semblance value greater than a prespecified threshold $V_{min}$ and less than a prespecified maximum value $V_{max}$ are analyzed by the next step 318.

Figure 10:
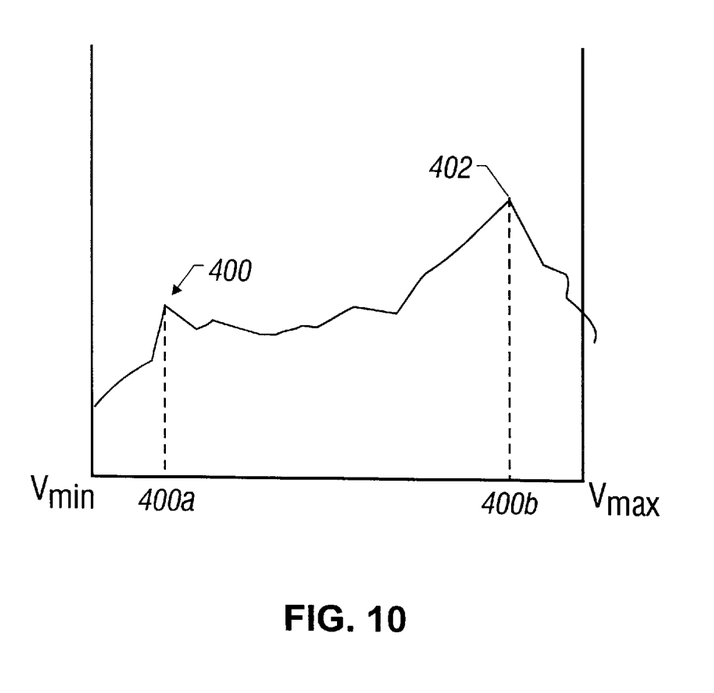
FIG. 10 is a schematic diagram of the histograms that are analyzed in the processing of the semblance data.

At step 318, a histogram is produced that represents the coherence of data passing the requirements of the tests at 316. FIG. 10 shows such a histogram where the abscissa is the coherence value (between $V_{min}$ and $V_{max}$) and the ordinate is the number of points in the coherence plot having that value. The respective values of $V_{min}$ and $V_{max}$ are typically 0.3 and 0.6 while the bin size of the histogram is 5% of this interval, i.e., 0.015. This histogram shows maxima 400, 402 at the coherence values of 400a, 402a. The process uses a known, prior art peak-finding technique to identify the maxima. The points in FIG. 9 that correspond to the peaks and the vicinity of the peaks are passed on to the step 320 for further processing. A check is made to see if data for all the tool positions have been analyzed at 324. If not, the processing proceeds to the next tool position 326 and the steps starting at 312 are repeated. If all the tool positions have been analyzed, the process continues to step 340.

The data passed to the side step 320 use the known velocity from 322 and equations (2) to determine a distance to bed boundary and a dip angle corresponding to each data point passed from 318. As noted above, when dealing with compressional wave reflections, a compressional wave velocity would be used whereas when processing shear wave reflections, a shear wave velocity would be used. These intermediate results 328 are accumulated until the process is ready for the final step 340.

Figure 11:
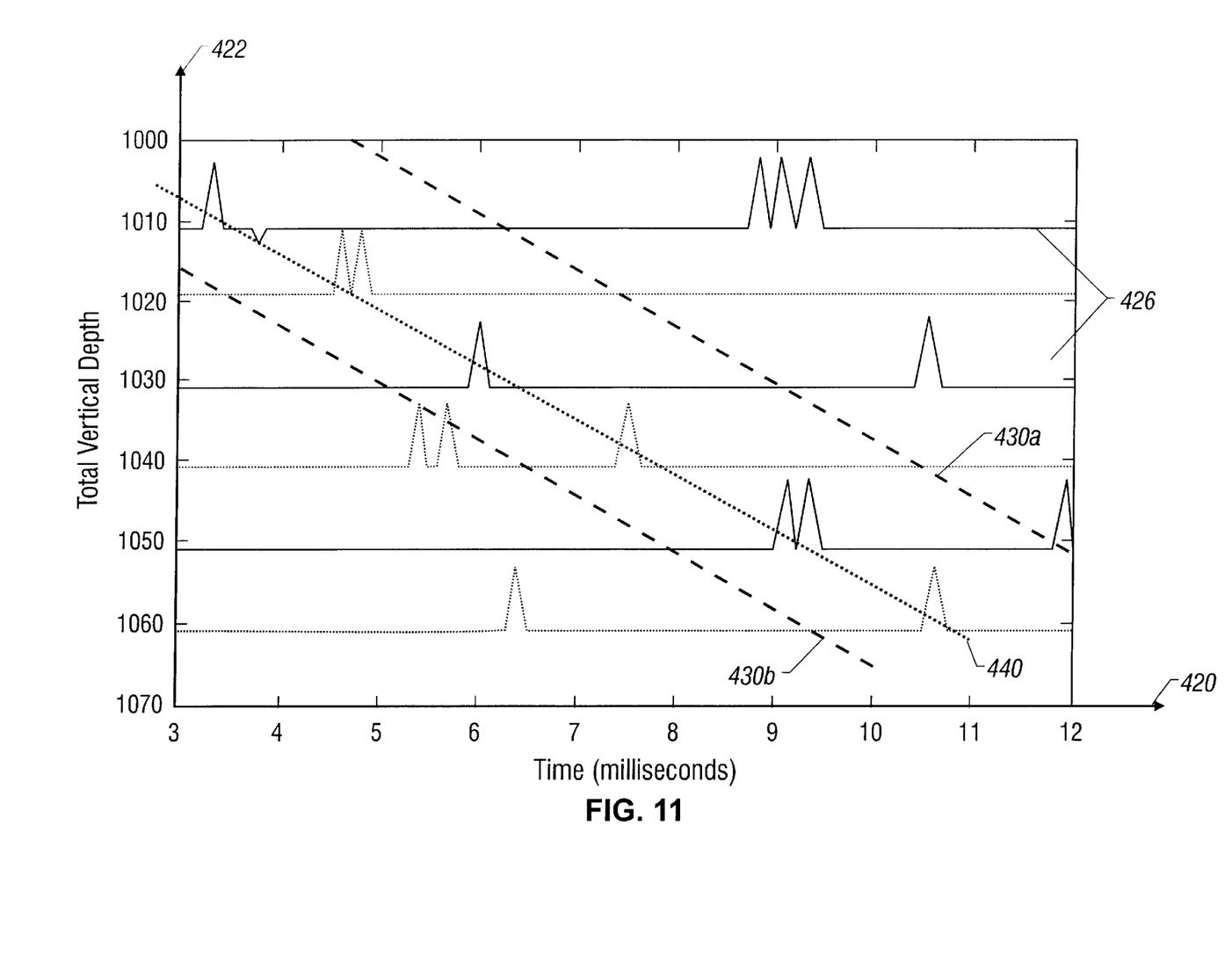
FIG. 11 is a schematic diagram illustrating the display of intermediate results that are used to determine the bed boundary.

The next step 340 has as its input all the intermediate results from 328 and the other information from 330. The intermediate results, as discussed above, consist of estimates of the distance to the bed boundary and the angle, both being referenced to the tool position. Combining this with the other information 330 that includes survey information about the tool position and its orientation makes it possible to display the intermediate results as a function of absolute position. This is schematically illustrated in FIG. 11 where the abscissa 420 is the time from the tool to the bed boundary and the ordinate 424 is the absolute depth of the tool. The "traces" 426 are displays of the coherence from the intermediate results 328. Also displayed in FIG. 11 is a window defined by lines 430a, 430b that gives the region in which the bed boundary is expected to be on the basis of the other information 330. Within this window, a coherency lineup denoted by 440 gives the correct position of the bed boundary on the basis of the data recorded by the sonic tool. This coherency lineup within the window defined by 430a, 430b may be determined by methods known in the art.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A downhole tool for determination of the position and orientation of a bed boundary during drilling of a wellbore, comprising:
   (a) a transmitter for transmitting acoustic signals at at least one position in the wellbore during drilling of the wellbore, said acoustic signals having an acoustic velocity;
   (b) a plurality of spaced apart receivers for detecting signals transmitted by the transmitter that are reflected by the bed boundary; and
   (c) a processor determining semblance of the reflected signals in a slowness domain and determining from said semblance and said acoustic velocity a distance and orientation of the bed boundary relative to the tool.

2. The downhole tool of claim 1 wherein the at least one position comprises a plurality of positions and the processor is further adapted to process the data from said plurality of positions to determine therefrom the absolute depth and position of the bed boundary corresponding to said plurality of positions.

3. The downhole tool of claim 2 wherein the processor further determines an absolute depth and position of the bed boundary corresponding to said plurality of positions.

4. The downhole tool of claim 3 wherein the processor determines the absolute position of the bed boundary using said semblances and a predetermined window based on supplemental information.

5. The downhole tool of claim 3 wherein the processor is further adapted to analyze said plurality of semblances to obtain a set of maxima of the semblances.

6. The downhole tool according to claim 1, wherein each receiver contains a plurality of individual sensors circumferentially disposed around the downhole tool.

7. The downhole tool according to claim 3, wherein the receivers includes a near receiver which is utilized for determining a near receiver travel time.

8. The downhole tool according to claim 1 further having an isolator between the transmitter and the near receiver for reducing the effect of acoustic waves traveling in the downhole tool.

9. The downhole tool of claim 1 wherein arrival times of reflected signals at the plurality of receivers are selected from the set consisting of (i) a hyperbolic function of a transmitter to receiver distance, and (ii) a linear function of a transmitter to receiver distance.

10. The downhole tool of claim 1 wherein the acoustic signal is selected from the set consisting of (i) a compressional wave, and (ii) a shear wave.

11. A method of determining the position of a bed boundary during the drilling of a wellbore, comprising:

(a) using a transmitter on a downhole tool to transmit acoustic signals at at least one downhole location;

(b) using a plurality of spaced apart receivers on the downhole tool to receive acoustic signals reflected by the bed boundary; and (c) using the downhole processor to process the acoustic signals to determine a position and orientation of the bed boundary relative to the downhole tool based upon a semblance of the received signals.

12. The method of claim 11 wherein the at least one downhole location comprises a plurality of downhole locations, further comprising:

(a) providing the downhole processor with supplemental and survey information relating to a position and orientation of the downhole tool at the plurality of downhole locations; and (b) using the downhole processor to determine an absolute position and orientation of the bed boundary from (i) the determined relative position and orientation of the bed boundary relative to the downhole tool, (ii) the survey information relating to the position and orientation of the tool, and, (iii) the supplemental information.

13. The method of claim 12 wherein the determination of the absolute position further comprises using the processor to analyze said plurality of semblances to obtain a set of maxima of the semblances.

14. The method of claim 11 wherein arrival times of reflected signals at the plurality of receivers are selected from the set consisting of (i) a linear function of a transmitter to receiver distance, and (ii) a hyperbolic function of a transmitter to receiver distance.

15. The method of claim 12 wherein the determination of the absolute position further comprises using said semblances and a predetermined window based on supplemental information.

16. The method of claim 11 wherein the acoustic signal is selected from the set consisting of (i) a compressional waver, and (ii) a shear wave.

17. A method of determining the position of a bed boundary during the drilling of a wellbore, comprising:

(a) using a transmitter on a downhole tool to transmit acoustic signals at a plurality of downhole locations;

(b) using a plurality of spaced apart receivers on the downhole tool to receive acoustic signals reflected by the bed boundary at each of said plurality of downhole locations; and (c) using a processor to:

(i) determine semblances of the acoustic signals in a slowness/offset-time domain at each of said plurality of downhole locations, (ii) filter the determined semblances to give a set of filtered semblances at each of said plurality of downhole locations, (iii) from said set of filtered semblances and a velocity of the acoustic signals, determine a relative position and orientation of the bed boundary corresponding to each of said plurality of downhole locations, and (iv) determine an absolute position and depth of the boundary from said relative positions and orientations and from supplemental information.

18. The method of claim 17, wherein the step of using the processor to filter the determined semblances comprises at least one of (i) a coherence filtering, and, (ii) a semblance filtering.

* * * * *

UNITED STATES PATENT AND TRADEMARK OFFICE
CERTIFICATE OF CORRECTION

PATENT NO : 6,023,443
DATED : February 8, 2000
INVENTOR(S) : Vladimir Dubinsky et al.

It is certified that error appears in the above-identified patent and that said Letters Patent is hereby corrected as shown below:

At column 11, lines 49-55:

$$Sem(T,S,w) = \frac{\sum_{i=1}^{n} (\sum_{j=t_i}^{j=t_i+w} f_i(j))^2}{\sum_{i=1}^{n} \sum_{j=t_i}^{j=t_i+w} f_i^2(j)} \quad (1)$$

Signed and Sealed this

Twentieth Day of February, 2001

Attest:

NICHOLAS P. GODICI

*Attesting Officer*    Acting Director of the United States Patent and Trademark Office